United States Patent [19]

Plesniarski et al.

[11] Patent Number: 4,642,853
[45] Date of Patent: Feb. 17, 1987

[54] SEAT BELT GUIDE LOOP

[75] Inventors: Edward J. Plesniarski, Warren; Richard D. Loose, Birmingham; Juan M. Capo, Sterling Heights, all of Mich.

[73] Assignee: General Motors Corporation, Detroit, Mich.

[21] Appl. No.: 846,279

[22] Filed: Mar. 31, 1986

[51] Int. Cl.⁴ .............................................. B60R 22/00
[52] U.S. Cl. .................................... 24/163 R; 24/198; 280/804
[58] Field of Search ..................... 24/163 R, 164, 198, 24/199; 280/804

[56] References Cited

U.S. PATENT DOCUMENTS

| | | | |
|---|---|---|---|
| 1,675,040 | 6/1928 | Mix | 24/198 |
| 2,051,173 | 8/1936 | Leonard | 24/198 |
| 3,959,855 | 6/1976 | Fisher | 24/163 R |
| 4,023,826 | 5/1977 | Kokubo et al. | 24/163 R |
| 4,052,772 | 10/1977 | Tolfsen | 24/163 R |
| 4,102,020 | 7/1978 | Lindblad | 24/164 |
| 4,142,274 | 3/1979 | Scholz et al. | 24/163 R |
| 4,359,236 | 11/1982 | Rogers, Jr. | 280/804 |
| 4,369,931 | 1/1983 | Fohl | 242/107 |

FOREIGN PATENT DOCUMENTS 560879 10/1923 France ................................ 24/198

Primary Examiner—Victor N. Sakran
Attorney, Agent, or Firm—Charles E. Leahy

[57] ABSTRACT

A seat belt guide loop is comprised of a stamped metal bracket having an aperture adapted to receive a bolt for pivotally mounting the guide loop on a vehicle body pillar. The stamped metal bracket has a belt slot therein of a width somewhat greater than the width of the belt and a height greater than the thickness of the belt. A molded plastic cover is molded in situ upon the stamped metal bracket and overlies the lower wall of the belt slot to define a low friction wall over which the belt is slidable. This plastic cover has a clearance slot which underlies the low friction wall and cooperates therewith to define a plastic bridge integral with and supporting the low friction wall. The clearance slot is of a width somewhat less than the width of the belt. When the belt is loaded during the restraint of an occupant, the plastic bridge elastically yields whereby the low friction wall bows into a curvilinear sagging configuration by which the belt is induced to remain in the center of the belt slot against any tendency to migrate to a bunched up condition at one end of the belt slot.

2 Claims, 7 Drawing Figures

SEAT BELT GUIDE LOOP

The invention relates to a seat belt guide loop for slidably mounting a seat belt on a vehicle pillar and more particularly provides an improved guide loop which prevents the belt from migrating and bunching up at one end of the belt slot when loaded.

BACKGROUND OF THE INVENTION

Motor vehicle seat belt systems commonly have a shoulder belt retractor mounted on the door pillar relatively near the floor. The belt exits the retractor and travels upwardly along the pillar where the belt extends through a guide loop which is mounted high on the pillar to deflect the belt diagonally downward across the occupant upper torso.

Such guide loops are commonly comprised of a sheet metal stamping or a bent rod which define a belt slot through which the belt slides. During such sliding movement of the belt, the belt bears upon the lower wall of the slot. Various prior art guide loops are disclosed in Tolfsen 4,052,772, in which FIGS. 1-4 show various arrangements by which the lower wall defining the belt slot may be modified to provide a somewhat rounded surface and avoid sharp edges in the area of contact with the belt. In FIG. 2 the guide loop has a suitable cover, such as plastic, which provides the rounded surface. In FIG. 3 the guide loop is stamped out of a somewhat thicker steel plate and at least the lower wall of the belt slot is forged to a rounded configuration. FIG. 4 shows the guide loop constructed of a round steel loop which conveniently provides a rounded surface for the belt to slide over. In FIGS. 2 and 3 of Tolfsen, the outer edges of the belt slot are turned upwardly.

Another prior art patent, Fisher U.S. Pat. No. 3,959,855, discloses three separate plastic elements which fit over the lower wall of the belt slot to provide a continuous plastic wall covering the belt slot to prevent the belt from reversing and folding upon itself or being bunched up.

Although all of these arrangements have been proven to provide a suitably strong slidable support for the seat belt and have been proven to function in the restraint of seated occupants under emergency conditions, the present invention provides a further improvement in such guide loops.

SUMMARY OF THE INVENTION

The guide loop according to the invention is comprised of a stamped metal bracket having an aperture adapted to receive a bolt for pivotally mounting the guide loop on the pillar. The stamped metal bracket has a belt slot therein of a width somewhat greater than the width of the belt and a height somewhat greater than the thickness of the belt. A molded plastic cover is molded in situ upon the stamped metal bracket and overlies the lower wall of the belt slot to define a low friction wall over which the belt is slidable. This plastic cover has a clearance slot which underlies the low friction wall and cooperates therewith to define a plastic bridge integral with and supporting the low friction wall. The clearance slot is of a width somewhat less than the width of the belt. When the belt is loaded during the restraint of an occupant, the plastic bridge elastically yields whereby the low friction wall bows into a curvilinear sagging configuration by which the belt is induced to remain in the center of the belt slot against any tendency to migrate to a bunched up condition at one end of the belt slot.

Accordingly, the object, feature and advantage of the invention resides in the provision of a molded plastic support wall overlying the low friction wall of a guide loop belt slot and further having a clearance slot underlying the low friction wall to define a plastic bridge yielding to a sagging configuration under belt load to induce the belt to remain at the center of the belt slot.

These and other objects, features and advantages of the invention will become apparent upon consideration of the specification and the appended drawings in which:

FIG. 1 discloses a prior art guide loop;

FIG. 2 discloses the prior art guide loop of FIG. 2 in which the belt is subjected to an occupant restraint load and the guide loop has tilted permitting the belt to migrate to one end of the belt slot;

DESCRIPTION OF THE PREFERRED EMBODIMENT

Figure 1:
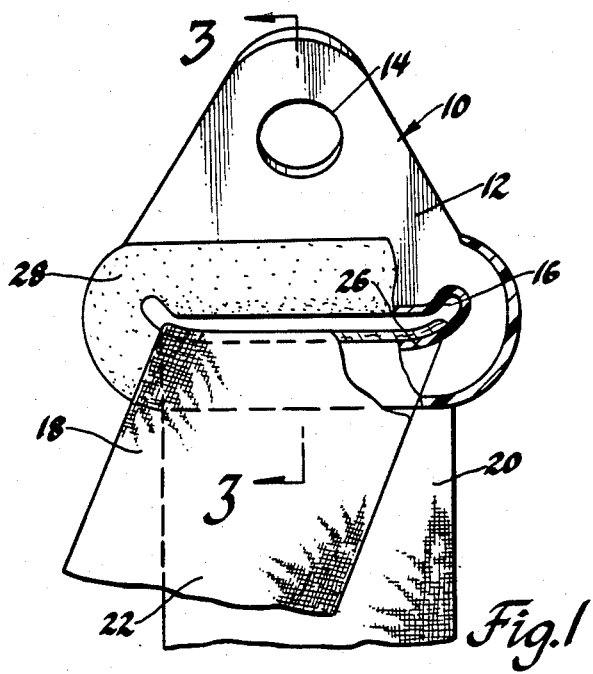
Figure 2:
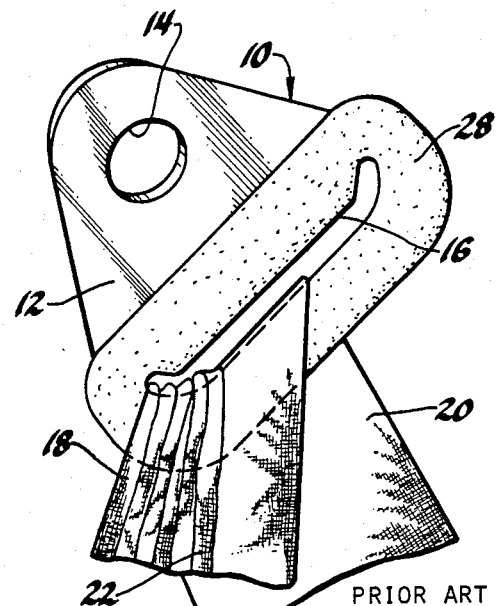
Figure 3:
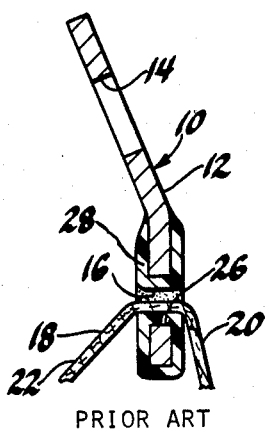
FIG. 3 is a sectional view taken in the direction of arrows 3—3 of FIG. 1.

Referring to FIGS. 1-3 there is shown a typical prior art guide loop 10 comprised of a stamped metal bracket 12 having an aperture 14 and a belt slot 16. The aperture 14 is adapted to receive a pivot bolt for pivotally mounting the guide loop on the pillar of the vehicle body. The shoulder belt 18 has a first portion 20 which extends upwardly from a seat belt retractor mounted at a low elevation on the pillar and extends slidably through the belt slot 16 and has a second portion 22 which extends diagonally downward across the occupant upper torso. The belt slot 16 is defined by a lower wall 26 across which the belt slides. In order to enhance the low friction travel of the sliding belt over the bracket wall 26, a molded plastic cover 28 is preferably molded in place over the slot wall 26. As best seen in FIG. 1 the ends of the belt slot 16 are preferably curled upwardly somewhat to better guide the belt, particularly since the shoulder belt portion 22 exits from the guide loop 10 at varying angles depending whether the seat occupant is resting against the seat back or leaning forwardly.

As best seen in FIG. 2, it will be appreciated that the imposition of a substantial load upon the belt in the forward direction tends to induce the belt to migrate to the forward end of the belt slot 16 and in so doing tip the guide loop 10 to its FIG. 2 position, further contributing to the migration of the belt to the forward end of the slot 16.

Figure 4:
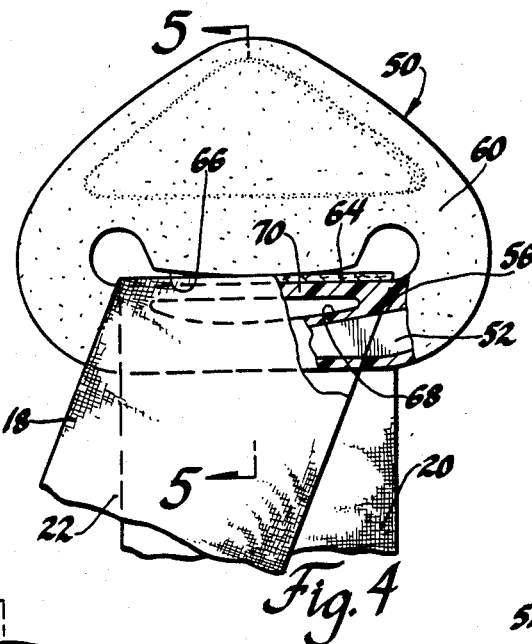
FIG. 4 is a frontal elevation view of a new and improved guide loop of this invention having parts broken away and in section.
Figure 5:
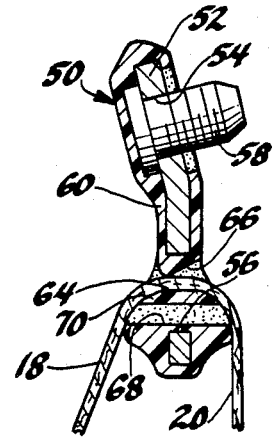
FIG. 5 is a side elevation sectional view taken in the direction of arrows 5—5 of FIG. 4.

FIGS. 4 and 5 disclose a new and improved guide loop 50 of this invention. The guide loop 50 includes a stamped metal bracket 52 having a bolt aperture 54 and a belt slot 56. A pivot bolt 58 extends through the aperture 54 to mount the guide loop 50 on the vehicle pillar. A molded plastic cover 60 is molded in situ upon the stamped metal bracket 52 and defines a low friction wall 64 upon which the belt is slidable. As best seen in FIGS.

4 and 5, the plastic cover 60 also defines a plastic upper wall 66 of the belt slot which overlies the low friction wall 64 and is spaced above the low friction wall 64 by a distance of slightly greater than the thickness of the belt 18.

As best seen in FIGS. 4 and 5, a clearance slot 68 extends through the plastic cover 60 beneath the low friction wall 64. As seen in FIG. 4, the width of the clearance slot 68 is somewhat less than the width of the belt 18. The provision of the clearance slot 68 underlying the low friction wall 64 defines a plastic bridge 70 which supports the low friction wall 64 as shown in FIGS. 4 and 5.

Figure 6:
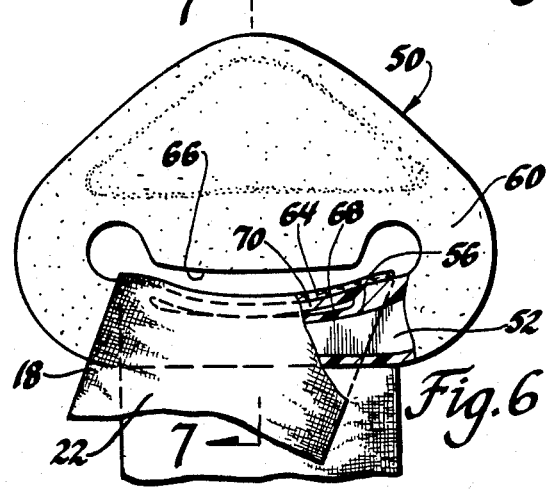
FIG. 6 is a view similar to 4 but showing the guide loop with the belt loaded.
Figure 7:
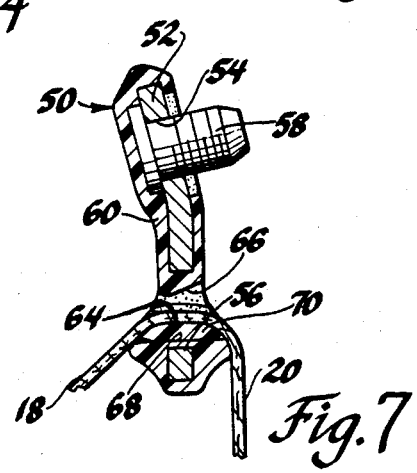
FIG. 7 is side elevational sectional view taken in the direction of arrows 7—7 of FIG. 6.

Referring to FIGS. 6 and 7, it is seen that an occupant restraint load causes elastic yielding of the bridge 70 through the space defined by the clearance slot 68 so that the bridge is bowed into the curvilinear sagging configuration of FIG. 6 and the low friction wall 64 assumes more of a smile shape which induces the belt to remain in the center of the belt slot instead of migrating towards an end of the belt slot as shown in FIG. 2. In comparing FIGS. 5 and 7 it will be understood that the height of the clearance slot 68 will determine the amount of sag which is obtained.

When the occupant restraint load is removed from the belt, the bridge 70 will return to its normal position of FIG. 4.

Thus it is seen that the invention provides a new and improved guide loop having a clearance slot underlying the plastic bridge over which the belt slides so that the bridge yields into the clearance slot to induce the belt to remain at the center of the belt slot against a tendency to migrate to the end of the belt slot.

The embodiments of the invention in which an exclusive property or privilege is claimed are defined as follows:

1. A guide loop adapted for pivotal mounting on a vehicle body pillar to mount a seat belt for sliding movement therethrough comprising a stamped metal bracket having a belt slot therein and a molded plastic cover enclosing the belt slot and defining a low friction wall over which the belt is slidable, said plastic cover having a clearance slot underlying the low friction wall and cooperating therewith to define a plastic bridge integral with and supporting the low friction wall, said bridge being elastically yieldable in response to a belt load imposed on the guide loop during restraint of an occupant by the seat belt whereby the low friction wall is bowed into a curvilinear sagging configuration by which the belt is induced to remain in the center of the belt slot against a tendency to migrate to a bunched-up condition at one end of the belt slot.

2. The guide loop of claim 1 further characterized by the clearance slot having a width less than the width of the belt.

* * * * *